United States Patent

[11] 3,587,303

| [72] | Inventor | Robert B. Corbett<br>Mars, Pa. |
|---|---|---|
| [21] | Appl. No. | 734,374 |
| [22] | Filed | June 4, 1968 |
| [45] | Patented | June 28, 1971 |

[54] ALIGNMENT MEASUREMENT
6 Claims, 9 Drawing Figs.

[52] U.S. Cl............................................... 73/103,
33/147, 73/88
[51] Int. Cl....................................................... G01n 3/06
[50] Field of Search............................................. 33/180 (A),
181, 46, 46.2, 174, 179.5, 147 (D), 147(G),
147(F); 73/95, 88, 103

[56] References Cited
UNITED STATES PATENTS

| 2,708,363 | 5/1955 | Nass................................ | 73/103 |
| 3,309,918 | 3/1967 | Scott et al...................... | 73/103 |

FOREIGN PATENTS

| 1,286,040 | 1/1962 | France........................ | 33/147D |

OTHER REFERENCES

Experimental Mechanics & Property of Materials by Carl Muhlenbruch, pages 161 & 162 Topic-" Optical Strain Gauge" (1955, Van Nostrand, N.Y., N.Y.)

*Primary Examiner*—James J. Gill
*Assistant Examiner*—M. Smollar
*Attorney*—Hymen Diamond ABSTRACT: An alignment extensometer (41, 43 FIG. 2) is disclosed for measuring the alignment of a test specimen 31 subject to axial stress. Misalignment is measured by simultaneously sensing the components of bending of the specimen 31 at two sets of opposite transverse points, one set at right angles to the other, (FIG. 3) with pairs of pivoted levers 45, 47 and 53, 55) which are deflected oppositely. The deflections for each set are added algebraically to produce a differential measurement of the bending.

ALIGNMENT MEASUREMENT

BACKGROUND OF THE INVENTION

This invention relates to stress analysis for materials and to the art of determining the tensile, creep, stress-rupture, stress-relax action and other related properties of materials and has particular relationship, and is directed, to the achievement of reproducibility of test conditions and results so that the results may be realiably compared. In the stress analysis of a material a stress (which may be tension or compression) is applied axially along a specimen of the material and the change in the specimen or the strain, is observed. The material may be at a high temperature during the test. (See application Ser. No. 673,765, filed Oct. 31, 1969 to Robert B Corbett). Typically a tensile stress is applied axially to the specimen and the elongation, creep, rupture, relaxation, and other like reactions of the specimen are observed. So that these observations may have significance, it is necessary that the stress be applied to different specimens of material under substantially the same conditions; that is, it is necessary that the stress to which each specimen is subjected be reproducible so that the reactions are truly comparable.

One important factor influencing reproducibility of test conditions and results is misalignment between the axis of load application, or the application of axial stress, and the longitudinal axis of the specimen. This factor, referred to as eccentricity, causes a bending stress to be superimposed upon the axial tensile stress thus causing the computed (apparent) strength of a material to be reduced by a magnitude depending on the misalignment. The eccentricity may be produced by misalignment of the stress-producing train or by small deviation of the element itself from linearity; typically, the axis of the gauge length of the specimen may be displaced with reference to the axis if its ends due to improper machining. But on the whole the materials which are of primary interest are of the high-strength limited-ductility type. During the testing the specimens are also sometimes notched so that even ductile materials tend to behave like hard brittle materials under test. There is also a growing trend to use smaller-diameter test specimen with corresponding shorter gauge length. As such smaller specimens require less load to obtain a desired pounds-per-square-inch loading, the testing machine and specimen train under these lighter loads do not always tend to align themselves elastically even if ductile.

The importance of axial alignment is recognized in the art. For example ASTM Recommended Practice E139,3 (b) says:

"Precautions should be taken to assure that the load on the specimen is applied as nearly axial as possible. It is difficult to obtain perfect axial alignment. However, the nonaxiality should not exceed that which will produce a difference of 15 percent in elastic strain readings on opposite sides of the specimen when an extensometer is positioned to measure the maximum effect of nonaxiality. It should be noted that brittle materials may require considerably better alignment than that which would produce a 15 percent variation in elastic strain."

The alignment extensometer is an instrument for measuring misalignment and is to be distinguished from an ordinary extensometer which measures strain averaging the strain on each lateral side of the specimen. It is an object of this invention to provide precise and reliable extensometer apparatus for measuring misalignment of a test specimen.

Conventionally the eccentricity, during loading, of a specimen can often be detected by elastic extension measurements taken at room temperature. Apparatus provided with alignment extensometers affording separate measurements on opposite sides laterally of the specimen reveals unsatisfactory alignment in respect to one plane when unequal strain is shown by the readings on opposite sides. Repeating this procedure with the points of attachment to the specimen at 90° to the first eccentricity test helps define the extent and orientation of an eccentricity. Such measurements are usually taken periodically on a gauge specimen at room temperature to check axial alignment. To achieve meaningful results it is necessary that the extensometer be capable of checking alignment in microinches.

In accordance with the teachings of the prior art two so-called Tuckerman optical strain gauges are located on the specimen gauge length but 180° apart. Readings of these two gauges are then taken with a special auto collimator telescope as the specimen is loaded. The Tuckerman gauges are then removed and replaced on the plane 90° to the first plane in which the gauges were disposed and the procedure is repeated.

In accordance with another prior art practice, four single-wire resistance strain gauges of a length approximately equal to the specimen gauge length are mounted on the specimen at angular spacings of 90°. The specimen is loaded (tensile stress) and data is taken with an electronic strain indicator which reads directly in microinches per inch.

The equipment required in the above-described prior art practice for checking axial alignment is expensive, delicate, and can be safely and effectively used only be highly skilled, qualified technicians. In addition, complex calculations must be made to determine the percent bending or eccentricity. In fact, very few laboratories or plants have this equipment or personnel trained in its use. The result is that very few tests are conducted in compliance with the alignment requirements of the recommended practices.

It is an object of this invention to overcome the above-described disadvantages of the prior art and to provide an extensometer for reliably and effectively checking the alignment of testing machines which shall be of low cost, shall lend itself to use of typical operators and technicians of no unusual skill in handling such apparatus and shall be capable of yielding accurate, preferably visible, direct measurements of misalignment without requiring complex calculations.

SUMMARY OF THE INVENTION

In accordance with this invention, an extensometer is provided which includes means connected to the specimen which produces deflections of opposite polarity responsive to any bending or eccentricity of the specimen. The bending is determined by adding the deflections algebraically. This means may include two sets of deflecting mechanisms connected to the specimen on two planes longitudinal of the specimen and intersecting in its axis which are at an angle to each other. The total bending of the specimen may then be determined by determining the vectorial resultant of the total deflections in the two planes. The angle between the planes is conveniently 90° and the resultant is equal to the square root of the sum of the squares of the two total deflections.

BRIEF DESCRIPTION OF THE DRAWING

For a better understanding of this invention, both as to its organization and as to its method of operation, together with additional objects and advantages thereof, reference is made to the following description taken in connection with the accompanying drawings, in which.

DESCRIPTION OF PREFERRED EMBODIMENT

Figure 1:
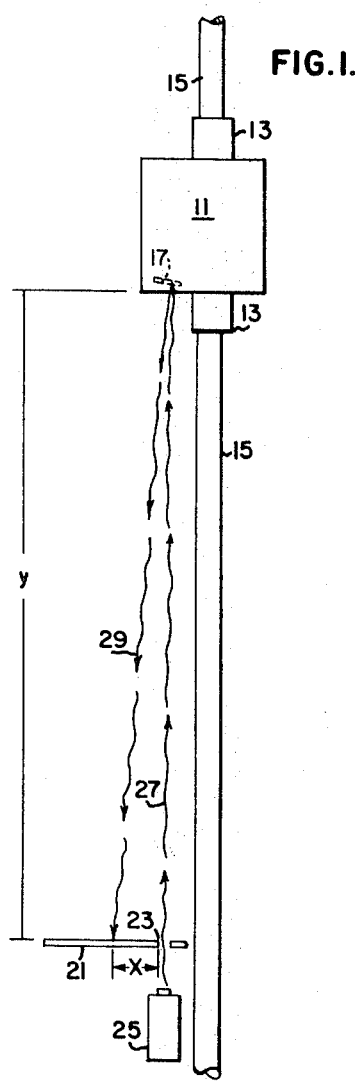
FIG. 1 is a diagrammatic view showing stress-analysis apparatus including an extensometer in accordance with this invention.

The apparatus shown in the drawing includes an extensometer-and-specimen 11 connected in a stress-producing chain 13 typically as shown in Corbett application 673,765. This chain has at both ends a pull rod 15 (90 Corbett FIG. 2) which applies the tensile stress. The bending in each of the cross planes is measured by the deflection of a mirror 17 in one plane and 19 in the other. Only mirror 17 is shown in FIG. 1. The mirrors 17 and 19 are front-surface, or front-silvered, mirrors to achieve the necessary high precision.

To measure the deflection of each mirror a plate 21 is provided adjacent to, but separated from, the lower pull rod 15. The plate 21 has an aperture 23 for the mirror 17 and another aperture (not shown) at right angles to the aperture 23 and appropriately separated from the aperture 23 for the mirror 19. A light source 25 for projecting a focused and collimated beam of light 27 is provided behind each aperture. The beam 27 is projected on the corresponding mirror 17 and 19 and the reflected beam 29 is deflected in accordance with the deflection of the mirror 17 or 19. The plate 21 has graduations (not shown) along the path of the reflected beam 29 incident on the plate 21 to indicate the deflection.

Figure 2:
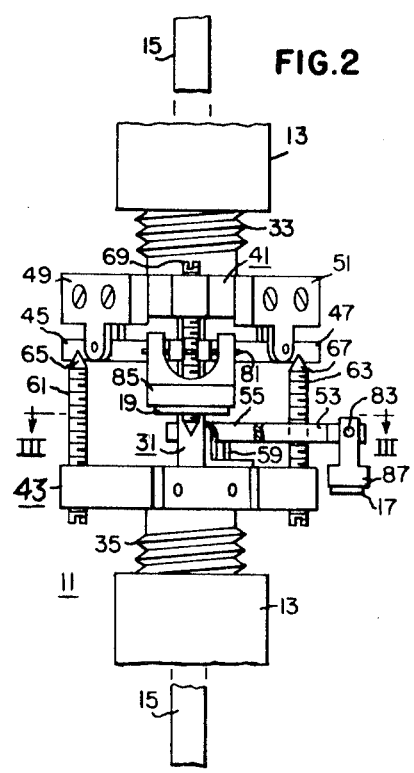
FIG. 2 is a schematic view showing an extensometer according to this invention and a specimen in misalignment measuring relationship.
Figure 3:
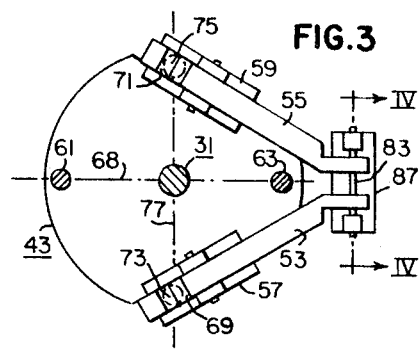
FIG. 3 is a view in section taken along line III–III of FIG. 2.
Figure 4:
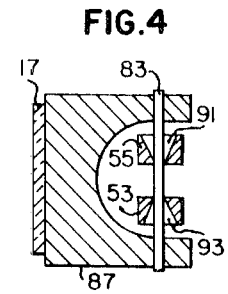
FIG. 4 is a view in section taken along line IV–IV of FIG. 3.

The extensometer and specimen 11 shown in detail in FIGS. 2 through 4 serves to determine the alignment of the stress-producing train and includes a specimen 31 having threaded ends 33 and 35 for installation and testing in a testing machine. The specimen 31 is of the same diameter, and gauge length (length of constricted section) of specimens subjected to tests in the apparatus. The threaded ends 33 and 35 could be replaced by buttons as disclosed in application 673,765.

The extensometer includes upper and lower platforms or plates 41 and 43 which extend from the ends of the gauge length of the specimen. The specimen 31 and the plates 41 and 43 may be integral, machined from one piece of metal, or the plates 41 and 43 may be made separately and assembled to act as a unit. Where the plates 41 and 43 are separately made they may be secured to the specimens by extensometer heads such as are shown in leaflet ARCL-13 of SATEC Corporation, P.O. Box 311, Grove City, Pennsylvania, U.S.A.

A pair of levers 45 and 47 are pivotally suspended from pivot supports 49 and 51 secured to plate 41. Another pair of levers 53 and 55 are pivotally suspended from pivot supports 57 and 59 secured to plate 43. Adjustable screws 61 and 63, screwed through threaded holes near the periphery of plate 43, having bearing tips 65 and 67 engage in bearing notches near the ends of levers 45 and 47 respectively. The line 68 between the points of engagement of the tips 65 and 67 in the notches passes through the axis of the specimen 31. Like adjustable screws 69 and 71 screwed through threaded holes near the periphery of plate 41 engage in bearing notches 73 and 75 near the ends of levers 53 and 55. The line 77 between the points of engagement of the tips of screws 69 and 71 in notches 73 and 75 also passes through the center of the axis of specimen 31 and is at right angles to line 68.

Pins 81 (FIG. 2) and 83 (FIG. 3) are suspended respectively from the ends of levers 45 and 47 and 53 and 55 remotely from the notches where the screws 61 and 63 and 69 and 71 respectively are supported. The pins 81 and 83 carry blocks 85 and 87 respectively. Pin 83 is suspended in oppositely facing conical holes 91 and 93 (FIG. 4) in the corresponding levers 53 and 55. Pin 81 is similarly suspended in conical holes (not shown) in levers 45 and 47. The small diameter ends of the conical holes (91, 93) serve as knife edges to support the pins (81, 83). When the pairs of levers are centered the pins 81 or 83 engage the small diameter ends of the conical holes but each pin is capable of pivoting relative to its conical holes on the small diameter holes as knife edges. The blocks 85 and 87 carry the mirrors 19 and 17 respectively. If, as shown in FIG. 2, screws 61 and 63 actually extend upwardly and pivots 49 and 51 downwardly, levers 45 and 47 may each be set for the response to bending by proper setting of the lengths of the lever arms on each side of each pivot pin, taking advantage of the weight of the arms, or by a tension spring 111.

The operation of the extensometer according to this invention may be understood with reference to FIGS. 5 and 5A and 6 and 6A.

Figure 5:
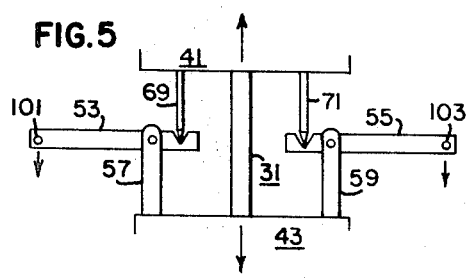
FIGS. 5 and 5A and 6 and 6A are diagrammatic views illustrating the functioning and practice of this invention.
Figure 5A:
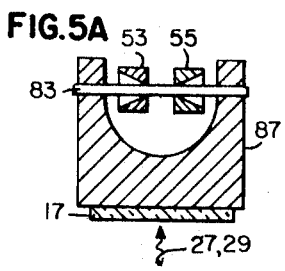

If a truly axial load is applied to specimen 31 FIGS. 5 and 5A) the elongation of specimen 31 is equal to the stress applied divided by the Modulus of Elasticity. This relationship applies up to the elastic limit of the material from which specimen 31 is made. For carbon and alloy steel E is 30,000,000 regardless of the hardness, chemical composition, heat treatment, etc., and is unaffected by changes in ambient temperatures. Since the load is axial the strain is uniform across the specimen. The ends 101 and 103 of the levers 53 and 55 (FIGS. 5 and 5A), and the ends of levers 45 and 47, move downwardly the same distance with the result that the blocks 85 and 87 and their mirrors are not tilted, as shown in FIG. 5A, and a light beam 27 striking the mirrors 17 and 19 returns back along the same path 29 along which it is incident.

Figure 6:
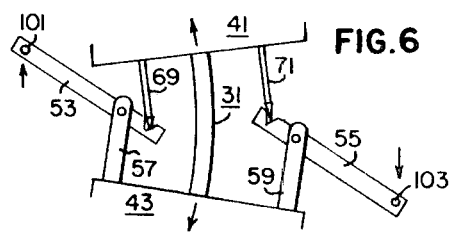
Figure 6A:
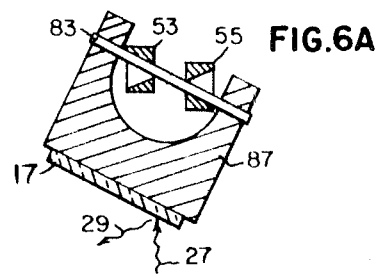
Figure 7:
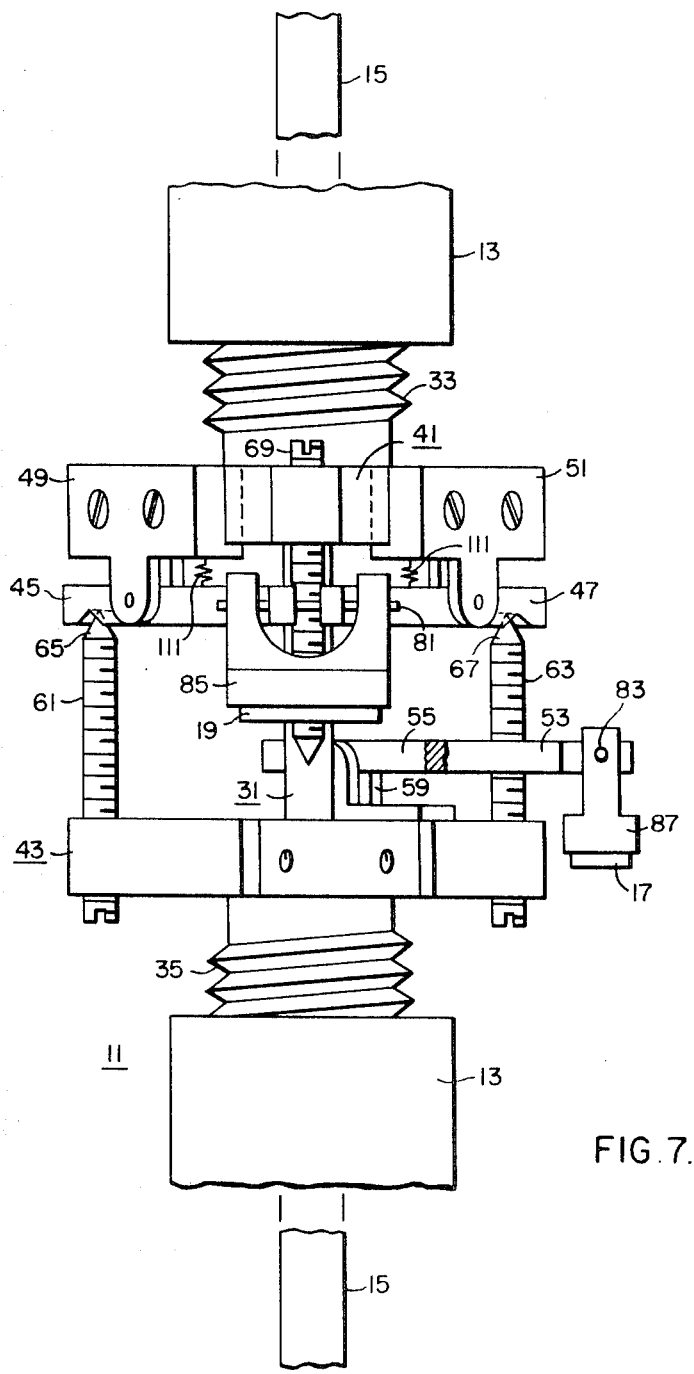
FIG. 7 is a view in side elevation showing an extensometer in accordance with this invention.

If the load applied to the specimen 31 is not truly axial, the test specimen is bent as shown exaggerated in FIG. 6. The ends 101 and 103 of the levers 53 and 55 (and of levers 45 and 47) move in opposite directions thus tilting the mirrors 17 and 19 as shown in FIG. 6A. The tilt of a mirror 17 or 19 which may be slight is amplified by the distance and angle through which the light beam 27—29 travels. The distance $x$ of the deflection of the light beam 27—29 is a measure of the bending of the specimen 31. The amplification of the tilt is dependent on the distance $y$ from the mirror to the plate 21.

The following Table I shows the results of an actual alignment check with apparatus according to this invention on a testing machine which was specially designed for axial loading.

TABLE I

| Load, lbs. | Strain, microns | Front mirrors | | | Side mirrors | | |
|---|---|---|---|---|---|---|---|
| | | Inches deflection | Microns | Percent binding | Inches deflection | Microns | Percent binding |
| 50 | 83.25 | .50 | 7.67 | 9.25 | .70 | 10.7 | 12.9 |
| 100 | 166.5 | .60 | 9.2 | 5.5 | 1.00 | 15.34 | 9.2 |
| 150 | 249.75 | 1.00 | 15.34 | 6.2 | 1.30 | 19.95 | 8.0 |
| 200 | 333.0 | 1.10 | 16.9 | 5. | 1.50 | 23.0 | 7. |
| 250 | 416.25 | 1.20 | 18.4 | 4.4 | 1.40 | 21.5 | 5.1 |
| 300 | 499.50 | 1.20 | 18.4 | 3.7 | 1.00 | 15.34 | 3.1 |
| 350 | 582.50 | 1.20 | 18.4 | 3.1 | 1.00 | 15.34 | 2.6 |
| 400 | 666.00 | 1.20 | 18.4 | 2.7 | 1.00 | 15.34 | 2.3 |

[Specimen .160" dia. x 650 gage length]

The tests were made on a specimen 31 having a diameter (constricted section) of 0.160 inches and a gauge length (constricted section) of 0.650. The left-hand column gives the loading in pounds in tension for each item of data. The second column gives the corresponding strain or elongation in microns ($10^{+6}$ inches). The third and sixth columns give the deflections of the two light beams 27—29 as measured on the plate 21. The fourth and the seventh columns give the corresponding bending or displacement of one end of the gauge length of the specimen with respect to the other. The fifth and the eight columns give the corresponding percent deflections. The deflections are measured in the planes defined by the respective points of engagement of the screws (61 and 63 and 69 and 71) in the notches and the axis of the specimen.

Let $B_1$ be the percent of bending in one plane and $B_2$ the percent in the other. Then $B_{max}$, the maximum bending, is given by $$B_{max} = \sqrt{B_1^2 + B_2^2}$$

The plane of maximum bending is at angle $z$ to the two planes at right angles such that $$\cos z = \frac{B_1}{B_{max}}$$

$$\sin z = \frac{B_2}{B_{max}}$$

The eccentricity of the specimen 31 is given by $$e = \frac{B_{max}(a)}{400 \text{ (maximum load)}}$$

where $a$ is the radius of the specimen 31. Table I shows that this invention, in spite of the facility with which it can be used, has the capability and accuracy at least equal to prior-art systems. Once the operator has made measurements as outlined in Table I, his experience allows him to merely note (without measuring) the movement of the two light spots (27—29) and thus to determine at once if the alignment is within the prescribed limits.

The alignment extensometer shown in the drawings is constructed to fit directly into the grips of the testing machine. It may also be constructed to clamp about a specimen 31 with clamping mechanisms as shown in SATEC Leaflet ARCL-13.

While preferred embodiments of this invention have been disclosed herein, many modifications thereof are feasible. This invention then is not to be restricted except insofar as is necessitated by the spirit of the prior art. The availability of this alignment extensometer makes practical compression as well as tension analyses of materials.

I claim:

1. An alignment extensometer for producing a measurement of the eccentricity in the alignment of a test specimen, subject to longitudinal stress, said alignment being measured along the direction in which said stress is applied, the said extensometer comprising means responsive to the eccentricity in a test specimen, while said specimen is undergoing stressing, said means connected to said specimen at opposite ends of said specimen transverse to the direction of said stress, said means simultaneously producing at least two indications which may be combined vectorially to give a measurement of the eccentricity or bending in the said test specimen, the first indication being of the bending in one plane of the specimen and the second indication being of the bending in a plane at an angle to the first plane, both of said planes being parallel to the line representing the intended direction of loading.

3. An alignment extensometer for producing a measurement of the eccentricity in the alignment of a test specimen, subject to longitudinal stress, said alignment being measured along the direction in which said is applied, the said extensometer comprising lever means, including levers pivotally connected to said specimen at one of its ends, said levers situated at laterally opposite positions from each other, projecting means located at the opposite end from said lever means, said projecting means equaling in number the levers and each of said projecting means aligned with and engaging a said lever at a point on said lever other than said pivotal connection, whereby as said specimen is stressed, the misalignment or eccentricity in the specimen is indicated by the difference in the pivoting of said levers, and means responsive to the sum of the difference in the pivoting of said levers to provide an indication of said eccentricity.

2. The alignment extensometer of claim 1 wherein the means responsive to the eccentricity includes a first means responsive to the bending of the specimen in the one plane, said first means including means for producing a first light beam and means for deflecting said first light beam in a first deflecting plane, the amount of deflection corresponding to the bending of the specimen in the one plane, and said means responsive to the eccentricity also including a second means responsive to the bending of said specimen in the second plane at an angle to the one plane, said second means including a second light-beam producing means and second deflecting means for deflecting said second light beam in a second deflecting plane, the amount of deflection corresponding to the bending in the second plane.

4. The alignment extensometer of claim 3 wherein the means responsive to the sum of the difference includes deflecting means connected to both said levers, to indicate by deflection the sum of the difference in the pivoting thereof, the magnitude of said deflection corresponding to the magnitude of said eccentricity.

5. The alignment extensometer of claim 3 wherein the deflecting means includes a mirror connected to the levers to be deflected by the pivoting of the levers, means for projecting a light beam on said mirror to produce, by its reflection from said mirror, a resulting reflected beam, and means for displaying the amount of deflection of said reflected beam.

6. The alignment extensometer of claim 5 wherein the mirror is of the front-surface type.